United States Patent [19]

Beck et al.

[11] E Patent Number: Re. 32,531

[45] Reissued Date of Patent: Oct. 27, 1987

[54] DEBONING APPARATUS AND METHOD

[75] Inventors: Nicholas R. Beck, Atlanta; Gordon C. Leonard, Dalton; Jack A. Prince, Gainesville, all of Ga.

[73] Assignee: The Kartridg Pak Co., Davenport, Iowa

[21] Appl. No.: 65,567

[22] Filed: Aug. 10, 1979 (Under 37 CFR 1.47)

Related U.S. Patent Documents

Reissue of:

[64] Patent No.: 4,042,176
Issued: Aug. 16, 1977
Appl. No.: 6,72,,317
Filed: Mar. 31, 1976

[51] Int. Cl.[4] ..... B02C 23/16

[52] U.S. Cl. ..... 241/24; 241/74; 241/82.3; 241/89.2

[58] Field of Search ..... 99/537, 538; 241/74, 241/82.1, 82.3, 24, 89.2; 100/147, 148

[56] References Cited

U.S. PATENT DOCUMENTS

| | | | |
|---|---|---|---|
| 1,775,743 | 9/1930 | Wiener | 241/247 |
| 1,961,808 | 6/1934 | Welsford et al. | 241/247 |
| 3,659,638 | 5/1972 | Paoli | 241/74 |
| 3,735,959 | 5/1973 | Keinath et al. | 241/246 |
| 3,739,994 | 6/1973 | McFarland | 99/537 X |
| 3,823,878 | 7/1974 | Ishikura | 241/73 |

*Primary Examiner*—Mark Rosenbaum

*Attorney, Agent, or Firm*—Lockwood, Alex, FitzGibbon & Cummings

[57] ABSTRACT

A deboning apparatus of the type for effecting a separation of boney material from the meat portion of fish, fowl, or other animals, and includes an auger means that is arranged through an adjoining pressure housing and perforated housing, with the auger means being coupled to for direct drive by a motor, for effecting its rotation within the said housing to achieve this meat-bone separation; the auger means includes a motor coupling section that connects directly to the motor, and which section incorporates a thrust bearing for absorbing axial thrust generated during functioning of the apparatus, a pressure auger section that is disposed within the pressure housing, and which includes an infeed section for deposition of the bone laden material therein, and wherein significant pressure is developed upon said boney material prior to its being conducted to a conveying auger section located within the perforated housing of the apparatus, and wherein the bone and meat material are substantially separated, with said auger further including a valved section that cooperates with a valved sleeve for maintaining back pressure for sustaining some of the pressure housing forces generated upon the bone laden material as it is being conveyed along the auger, with all segments of the auger, and the various pressure and perforated housings being supported by a base member that bearing mounts the two approximate ends of the auger for providing total and firm stability for the apparatus throughout its extent.

34 Claims, 4 Drawing Figures

DEBONING APPARATUS AND METHOD

Matter enclosed in heavy brackets [ ] appears in the original patent but forms no part of this reissue specification; matter printed in italics indicates the additions made by reissue.

BACKGROUND OF THE INVENTION

This invention relates generally to the separation of meat from bone in a deboning appartus, but more particularly, pertains to a deboning apparatus that provides the designed support for all of its operating mechanisms in an axially disposed directly driven auger for inducing the separation of bone from meaty material.

A variety of prior art devices have been available for use in the separation of one component from another particularly in the food processing industry. For example, the U.S. Pat. No. 2,322,791, to DeBack, discloses the use of a cylinder screen surrounding a compression screw, and having an annular space formed between tapers at one end of the screw for use in maintaining back pressure for inducing the expressing of juice from fuits and vegetables deposited into the shown extractor. This type of extractor is pertinent for disclosing the use of an annular valve like means at the end of its screw for regulating the rate of discharge of the fruit pomace from the extractor during its functioning. The Japanese fish industry has long utilized a sorting apparatus for straining fish meat from its vertebrae structure particularly after the whole fish has been filleted thereby having residue meat remaining upon the boney structure of the fish. This type of embodiment is disclosed in the Japanese utility model application publication No. 5757/1965, wherein a screw is disposed within a material feed inlet for conveying the deposited fish meat towards a part of the screw that conveys the material towards a strainer roll that is concentrically arranged around the screw so that the meaty component of the fish will be pressured through the roll while the bones are conveyed towards a pressure or squeezing cylinder so as to maintain back pressure upon the material as it is conveyed along by its screw. The strainer disclosed in this publication shows generally the type of arrangement for pressure cylinders that are currently used in the deboning industry, usually with the entire apparatus itself being projecting usually from a bin that holds the bulk of the boning mateial prior to its being fed into the strainer assembly as herein defined. One of the main problems with this type of prior art apparatus is that the unsupported aspects of its strainer arrangement generates a high degree of vibration during functioning, which has generally limited the operational characteristics of the roll or screw itself at speeds always well below 500 revolutions per minute. Further problems with this type of prior art strainers is that the motor means providing for rotation of the screw has ordinarily not been directly coupled to the shaft of the screw itself, mainly because thought had not been given to the possibility of locating the motor in a direct drive coupling relationship to one end of the screw, generally because of lack of space thereat, and also because these type of strainers, as previously analyzed, were connected directly into the hopper or bin holding the bulk laden material, and wherein, for sanitary reasons, a motor means generally could not be located. Also, prior art deboners operated at much slower speeds which means that their screws could not be directly coupled to the motor. As a result, all of these prior art strainers generally achieve a turning of their screw by an intermediate gear box, and therefore, they are indirectly driven by the motor or drive means. An example of the more contemporary employment of this type of feature in a deboning apparatus currently being marketed is shown in the U.S. Pat. No. 3,739,994, to McFarland. In this particular patent, a compression type of screw is arranged within a meat grinder segment, while the extension of its screw is likewise formed as a compression type screw that is arranged within a perforated conduit. More significantly, it should be noted that the entire apparatus shown therein is of the cantilevered type, and mounts directly to a bin, at one end, and from which the boney material is passed into the grinder segment of the apparatus, with the compression screw achieving its drive indirectly through a gear box as shown. Once again, this particular apparatus of the prior art developes extremely high pressure throughout its extent during its functioning, and since it is unsupported, except at one end, as by being mounted only at one end, it generates enormous vibrations in the event that it is operated at any speeds in excess of 400 rpm. Furthermore, this type apparatus constantly developes enormous compressive pressures entirely along the length of its screw, thereby causing a more accelerated deterioration and frequent replacement of its perforated conduit.

It is, therefore, the principal object of this invention to provide a deboning apparatus that is fully supported by an integral base member throughout its length, particularly being bearing mounted at both of its ends so that it may be operated at excessively high revolutions so as to achieve a quicker functioning and greater capacity separation of meat from its boney component during usage of the apparatus.

Another object of this invention is to provide a deboning apparatus wherein its auger means arranged within the pressure and perforated housings is directly driven by a motor means without significant vibrations due to the presence of thrust bearings for absorbing the axial forces generated during functioning of the apparatus.

A related object of this invention is the provision of bearinged pillow blocks integrally upon the base member of a deboning apparatus for fully supporting the operating auger at its approximate ends to thereby eliminate any induced forces or vibration even while the apparatus operates at excessively high speeds.

Another significant object of this invention is to provide a deboning apparatus that can achieve two to three times the meat separation capacity output that can be attained from any other meat separating apparatus currently or heretofore available to the trade.

Another object is the provision of a deboning apparatus that is formed having its driving motor directly and axially coupled to achieve a rotation of its auger.

Yet another object of this invention is to provide a deboning apparatus that can operate at speeds in excess of 500 rpm and even up to as high as 1800 rpm.

A further object of this invention is to provide a deboning apparatus incorporating an auger which is separable into a motor coupling, pressure conveying, and valve sections, which are easily separable from each other so as to facilitate either quick assembly, or separation as for cleaning, maintenance, and parts replacement.

Still another object of this invention is the provision of a deboning apparatus in which its infeed means can be pivotally moved from providing intake of the bone laden material from a variety of directions thereby adding to the versatility and portability of the apparatus for usage.

A further principal object of this invention is to provide a deboning apparatus in which the significant pressures to achieve meat separation from its bone are built up almost exclusively within its pressure housing section, with said prepressuring being somewhat maintained and gradually dissipating during conveyance of the boney material through the perforated housing of the apparatus.

Yet another feature of this invention is the functioning of a deboning apparatus wherein the pressure release from the prepressurized bone laden material as it traverses by a perforated housing achieves the expressing of the meat from the housing without necessitating any further build up of pressure within the said housing during functioning of the deboning apparatus thereby lessening the wear upon its said perforated housing.

A related object and benefit achieved from the aforesaid type of function is the reduced abrasion exerted upon the interior of the said perforated housing thereby reducing its incidence for early replacement.

Yet a further object is the provision of a deboning apparatus wherein prepressuring is achieved through the cooperation of a grinder that couples directly to the infeed region of the pressure housing of the deboning apparatus.

Another important object of this invention is the provision of a one piece integral solid metal base member for a deboning apparatus that totally supports all of the operating components of the same.

Another object of this invention is the provision of an axially arranged discharging means directly beyond the valved section of the deboning apparatus so as to achieve a rapid removal and disposal of the boney components away from the perforated housing.

Another object is to achieve a bone abrading separation of fish or meat from its boney components within a perforated housing section that is achieved mainly through a high speed rotation of its contiguous auger.

These and other objects will become more apparent to those skilled in the art upon reviewing the summary of this invention, and upon undertaking a study of the description of the preferred embodiment in view of its drawings.

SUMMARY OF THE INVENTION

The deboning apparatus of this invention is, upon first appearance, designed to provide a very compactly arranged group of components that complement each other to satisfy all of the requirements necessary to achieve high speed and high yield separation of residue fish, fowl, and red meat from its boney segment. Structurally, and as previously briefly abstracted, the invention comprehends the use of a structurally inherent one-piece base member that is fully supportive of all the operating components of this invention, having a direct drive linkage with the motor means for inducing an axial rotation of an auger means throughout its longitudinal extent, with said auger means being segmentable to provide discrete operations along its length to achieve the aforesaid end result. The rigidly coupled auger means is fully supported at both of its ends by means of pillow blocks that extend integrally up from the said base member, and which pillow blocks include bearings that insure vibration free true axial rotation of the said auger during functioning of the apparatus. In addition, the apparatus includes a pressure housing, which is also supported by integral supports extending up from the said base member, and a perforated housing which further is held by supports that extend likewise integrally from the said base member. This type of support is necessary to provide the means for insuring an accurate rotation for the auger axially disposed through these said housings, thereby dampening any vibrations that can be induced due to the high speed operation of the directly coupled motor means; while a thrust bearing cooperates with one of the pillow blocks, preferably that one nearest to the motor means, so as to absorb and cushion against any axially directed forces generated due to the pressure displacement of the boney material within the aforesaid housings, particularly the pressure housing, by actuation of the auger means, which, as can be readily understood, generates an enormous force axially against the auger and in a direction rearwardly towards its drive motor.

Preferably, the motor means inducing the rotation of the auger means of this invention will be in the range of a 50 horsepower, 220 or 440 volt motor, and will operate in the vicinity of 1160 rpm. On the other hand, tests have shown that a lower powered motor means that induces rotation of the auger in the vicinity of 500 rpm, or even a larger capacity motor means that can induce a rotation of the auger means to as high as 1800 rpm, has been found to work, but the preferred embodiment, as will be hereinafter analyzed, generally operate in the vicinity of 1200 rpm. At these speeds, it has been found that the deboner of this invention has the capacity and is capable of producing 6000 pounds per hour of meat as separated from its boney components, a capacity that is more than twice that of any known machine, and further significantly, during that type of functioning, to achieve that high of yield, there is very little temperature rise that occurs within the various pressure and perforated housings, and generally there is only a rise in the range of 2° to 3° Fahrenheit. Other prior art apparatuses, that operate at much lower speeds, have product temperature increases undesirably by as much as 12°. This is significant because it is believed that the high speed operation of this deboning apparatus, and wherein the bone laden material is prepressurized almost totally within the pressure housing by means of the pressure auger section located therein, directly after its infeeding into the said housing, induces enormous pressures upon the material at this location, as high as 15,000 psi, so that a further pick up and movement of the said material, under pressure, through the perforated housing section of the apparatus is achieved alone by a conveying auger section, wherein no additional pressure is generated upon the material, but rather, such prepressure is either maintained, or gradually released as the material moves down the length of the said perforated housing. Hence, while there is some agitation of the boning components within the material during its conveyance within the perforated housing, which has a tendency to achieve effective separation of the ground meat from its bone, with the constant pressure not being significantly increased upon the material at this location is believed to effectively dampen or reduce any temperature rise at a degree no more above the range previously delineated. In prior art type of deboning apparatuses where the material is conveyed by a compression auger throughout its extent, and even within the perforated screen portion of the deboner, this increasing force generated upon the material gives rise to the generation of high temperatures in the material that is totally undesirably in such an apparatus. This separated meat material from its boning component is to be sold as a raw meat residue product, and not one that has been heated to any degree by abrasive action to an extent that the meat will be scorched, which can give rise to an environment that induces bacterial action within the material after its discharge from its perforated housing and into a collecting hopper. Hence, there is very little friction or heat built up in the perforated housing section of this invention.

Other structural features of this invention include a valve section of the auger that cooperates with a valve sleeve mounted upon a support extending from the base member, and which support is slidably arranged for removal from its mounting to the base member when desired. Some fastening means, including rods, connect between a pair of supports, one of them being this removable support, and which provide for retention of the perforated housing, and when said rods are removed, the slidable support, and a threaded sleeve held therewith, can be removed, in addition to their valve sleeve which engages within said first mentioned sleeve, so that the perforated housing itself, in addition to its pressure housing, may be removed to facilitate cleaning. In addition, the valve sleeve itself may be disengaged from its threaded engagement within the first mentioned support sleeve, so as to provide a more direct access to the auger means as axially arranged within the aforesaid housings. A further axial shaft extends from one end of the auger means, and it is actually this particular shaft that is bearing mounted to the front end pillow block of the apparatus. This axially arranged shaft is disposed through an axial aperture provided through the center of the conveying auger and valved sections of the auger means, with said shaft having a threaded internal end that threaded engages within a bore provided some distance within the proximate end of the pressure auger section of the auger means. Hence, when this axial shaft of the auger means is disengaged from the same, it can be withdrawn from the bearing pillow block, the valve sleeve of the valve means of the apparatus can be threadedly withdrawn, and in this manner, the combined conveying auger and valved sections of the auger means may be withdrawn from within the interior of the perforated housing, to be readily cleaned. The conveying auger section, only being coupled to the pressure auger section by means of a series of splining pins, can be simply disengaged therefrom through an axial pull of the same and withdrawing it from the perforated housing. And, since the proximate support extending from the base member is adjustable, and can be slidably disengaged from the same, a withdrawal of said support allows for a removal of its retaining sleeve, which likewise allows for the removal of the perforated housing, and in addition, allows for an axial removal of the pressure housing from the apparatus, thereby allowing all of these components to be easily cleaned or replaced, as desired. Finally, once all of the aforesaid components are removed from the apparatus, the pressure auger, being threadedly engaged within the motor coupling section of the auger means, can be turned to provide for its threaded disengagement from said coupling section, thereby allowing the pressure auger section to likewise be removed for its cleaning. As is well known, the United States Department of Agriculture requires that the utmost care be taken in the maintaining of cleanliness in the processing of food products, and the processing of bone laden meat material, as herein described, is of no excepton. The ease of assembly or disassembly that can be attained for this deboning apparatus in the manner as previously described allows for a very prompt disengagement of the meat contacting components of the apparatus, so that they can be promptly washed and cleaned daily, and then immediately reassembled for the next days run. Such promptness and ease of assembly enhances the production time of the apparatus.

BRIEF DESCRIPTION OF THE DRAWINGS

In the drawings, FIG. 1 provides an isometric view of the deboning apparatus of this invention.

DESCRIPTION OF THE PREFERRED EMBODIMENT

Figure 1:
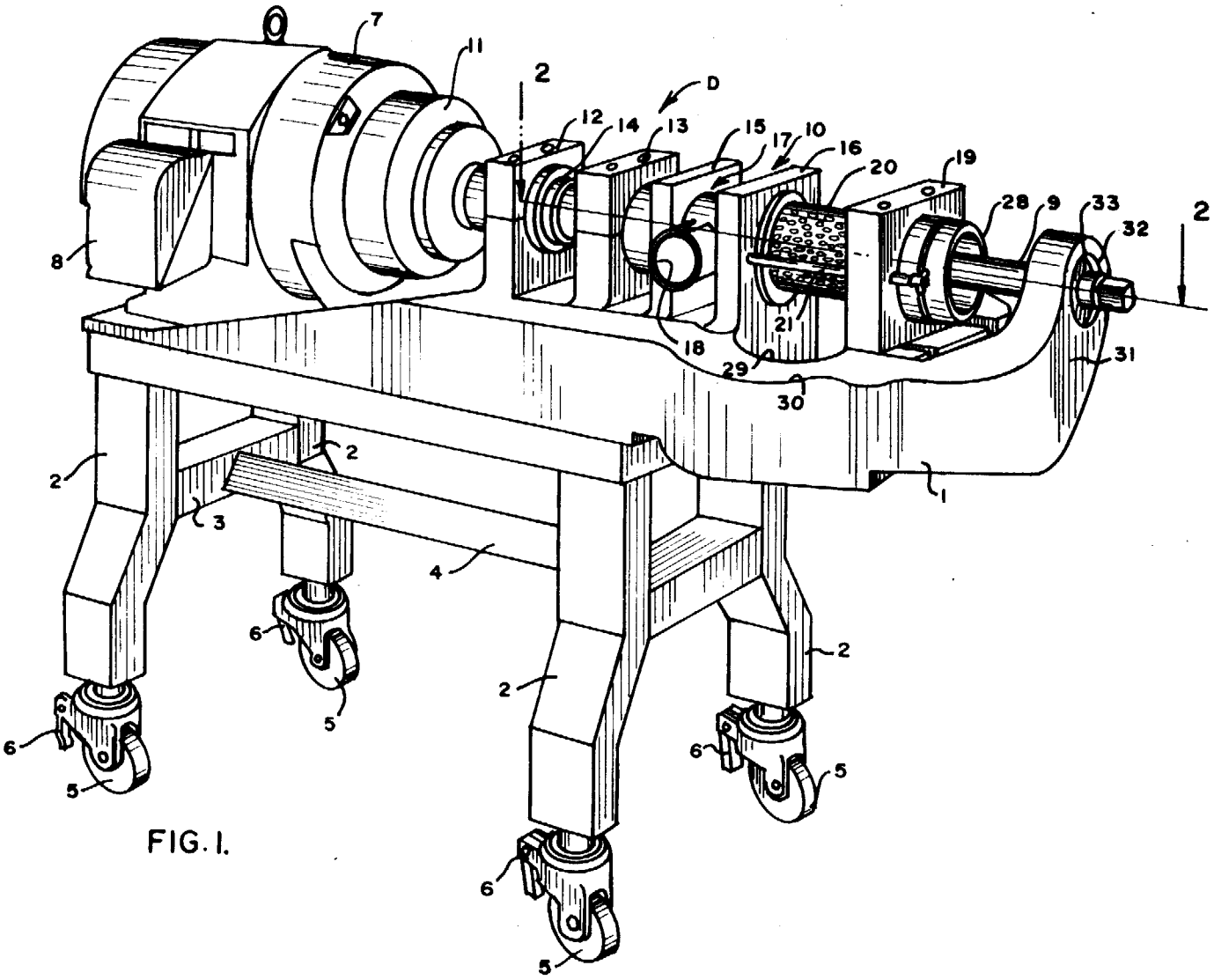

In referring to the drawings, and particularly FIG. 1, the deboning apparatus D of this invention is disclosed as comprising a base member 1 that is essentially shown as extending almost the full length of the apparatus, and in this embodiment, is formed as a solid cast aluminum base that provides a rigid support for the operating instrumentalities of the apparatus located thereabove. But, extending downwardly from the base member 1 are a series of reinforced legs 2 being substantially braced laterally, transversely as at 3, and longitudinally as at 4, so as to provide very stable support for the apparatus when both in transit, but particularly, when in use. To facilitate the former, provided downwardly from each leg 2 of the apparatus is a caster 5, with each caster being provided with an adjustable type of locking mechanism 6 so as to allow for the apparatus to be fixed in position as during usage, thereby preventing its shifting as might be caused under circumstances generated by the inherent torque created during operation of this high speed deboning apparatus.

As also shown in FIG. 1 provided upon the one end of the base member 1 is an electrical motor 7 which contains the usual electronic component motor control box 8 that furnishes particular control to the electrical energy supplied to the motor 7. For example, rectifiers or other components may be contained in the housing 8, such as for creating a rectification of the usual alternating current in the event that the motor 7 comprises a direct current motor. In any event, in the preferred embodiment, the motor 7 comprises a 50 horsepower motor that is capable of operating at speeds of 1160 rpm, and can be energized as either a 220 or 440 d.c. voltage. As previously described in the summary of this invention, other motor speeds may be used in conjunction with the operation of this deboning apparatus, and speeds as low as 500 rpm, as generated from a motor of smaller size, or speeds as even as high as 1800 rpm, as from a larger capacity motor, could work in conjunction with the deboning mechanisms as wil be hereinafter described in this apparatus.

Extending forwardly from the motor 7 internally along the remaining length of the apparatus and terminating at an auger shaft extension 9 is the auger means 10 of this apparatus. This auger means, as will be later more fully described, is primarily disposed within various components that complement the operation of this apparatus, but essentially, one end of the auger means is connected by means of a flexible coupling 11 to the shaft of the rotor of the motor, and this particular coupling is of the type that provides for a direct connection and direct drive of the auger means by the motor 7. Obviously, many other forms of couplings may be made between the auger means and the motor, but the particular coupling utilized in this embodiment may be of the type acquired from Dodge Corporation, of Mishawaki, Indiana, under model No. PX-120. Extending upwardly approximately at the midpoint of the base member 1 are a pair of pillow blocks 12 and 13, which pillow blocks are disclosed as being integrally formed extending from said base. Each said pillow block, as will be hereinafter described, mounts a bearing that provides for the very near frictionless rotation of the auger means 10 therethrough. But, in order to cushion and absorb any longitudinal thrust that may be generated through the cooperative operation between the auger means 10 and the various associated mechanisms of this deboning apparatus, intermediate the two pillow blocks 12 and 13 there is provided a thrust bearing 14 designed to provide for this dampening of any axial thrust generated during functioning of the deboning apparatus. Such a bearing may be acquired from Torrington Company, of South Bend, Ind., under model No. 30TP106.

Further forwardly of the apparatus and provided integrally extending upwardly from the base member 1 are a pair of supports 15 and 16 which are designed for providing the means for mounting of the pressure housing 17 within the deboning apparatus, in addition to the pivotal mounted infeed sleeve 18 of the apparatus, and through which the ground bone laden material yet to be deboned enters into the influence of the auger means of this invention.

Provided further forwarded of the base member 1 of this invention is another support member 19, which support member may be slidably mounted upon the base member 1 for purposes that will be subsequently described. In any event, secured intermediate the support 16, and the support 19, is a perforated housing 20, which housing is held in place between these two supports 16 and 19 by means of a pair of fastening rods, one as shown at 21, that span the distance between the two said supports, with the outer end of the rod 21 having a threaded fastener, such as a wing nut connection for snug retention on the perforated housing therebetween.

Figure 4:
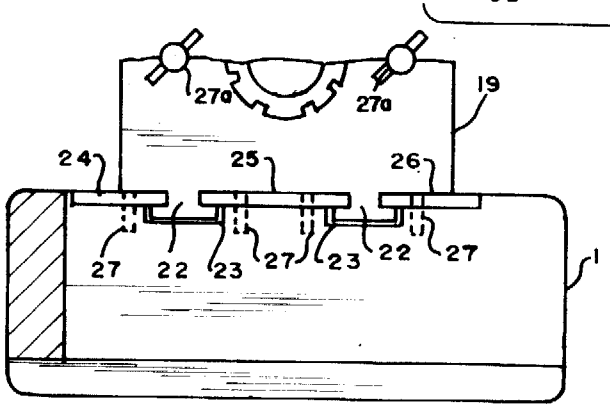

As can be seen in FIG. 4, this slidable support member 19 includes a pair of integral guides 22 that are arranged for slidably mounting within the slideways 23 provided in this segment of the base member 1. A series of plates 24, 25 and 26 are fastened by means of bolts 27 to the base member 1, to provide the means for retention of the guides 22 within the said waves 23. Hence, once the support member 19 is slid into the position shown in FIG. 4, and the wing nuts 27a tightened to the rod 21, this particular support, in conjunction with the previously described support 16, firmly hold the perforated housing 20 in place.

Extending out of the support member 19, and concentrically surrounding the extension shaft 9 is the valve sleeve 28 that cooperates with the valved section of the auger means as will be subsequently described.

It is to be noted that the base member 1 below the vicinity of the location of the perforated housing 20 provides a substantial opening, as at 29, the base member actually being flared as at 30, on both sides, to provide substantial spacing for provision of this opening 29, and it is through this opening that the meat material separated from the boning components as it expresses from the perforated housing 20 may fall downwardly therethrough for collection within a bin or basket (not shown). The base member 1, further proximate this end, is cast having an upwardly and inwardly disposed integral portion 31, that is further provided having an aperture 32 arranged therein and in which a bearing 33 is disposed for providing a near frictionless rotation of the auger means 10, or more particularly its shaft portion 9 thereat. The bearing 33 at this location may be any type of journal bearing for providing full support but as near frictionless rotation as possible for the auger means. Such a bearing may be acquired from Dodge Corporation, of Mishawaki, Ind., under model No. 060252. Hence, full bearing support is provided at both ends of the auger means 10 by means of the bearinged pillow blocks 12 and 13, and the bearing 33.

Figure 2:
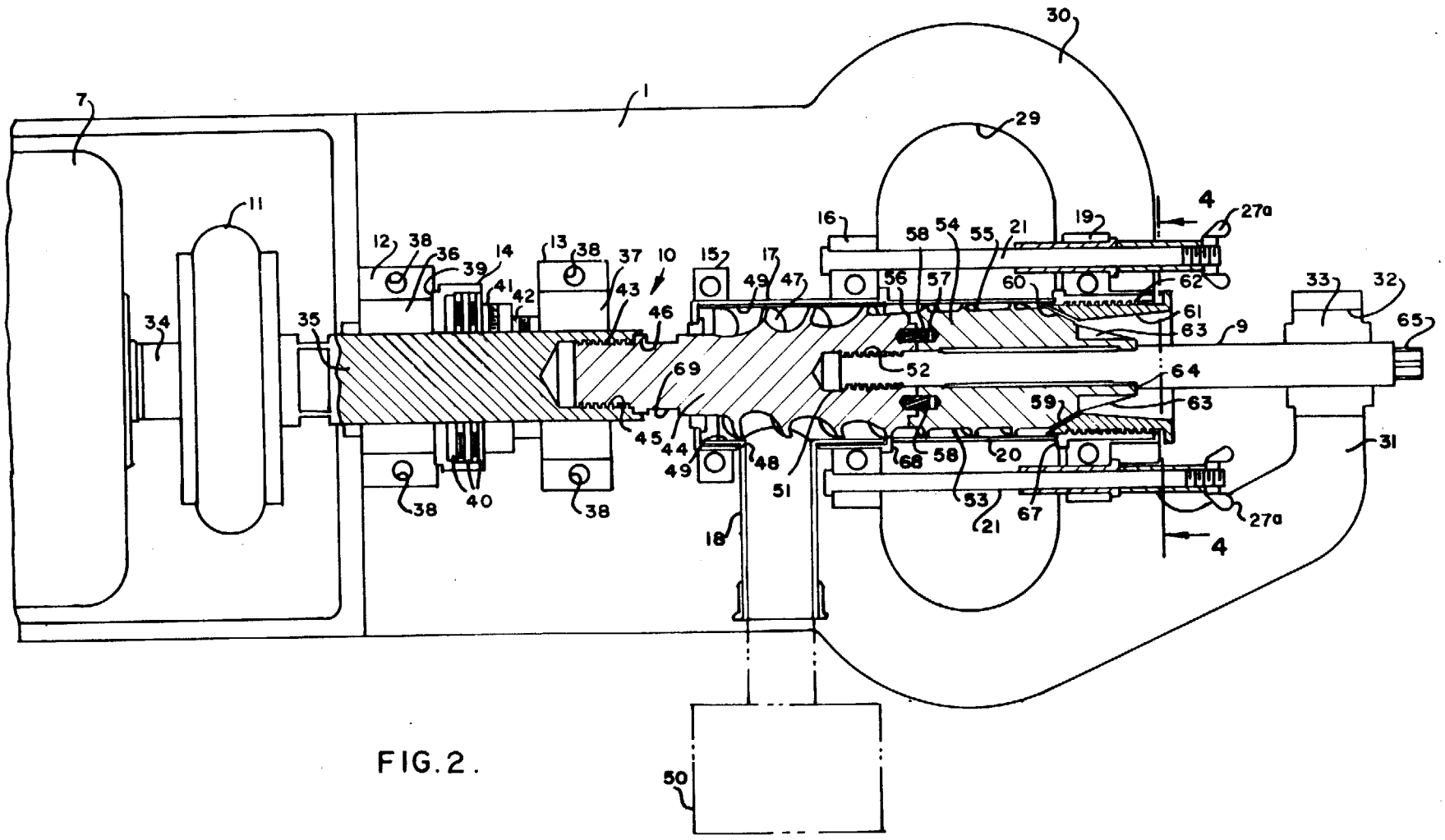
FIG. 2 provides a vertical sectional view of a part of the apparatus taken along the line 2—2 of FIG. 1.
Figure 3:
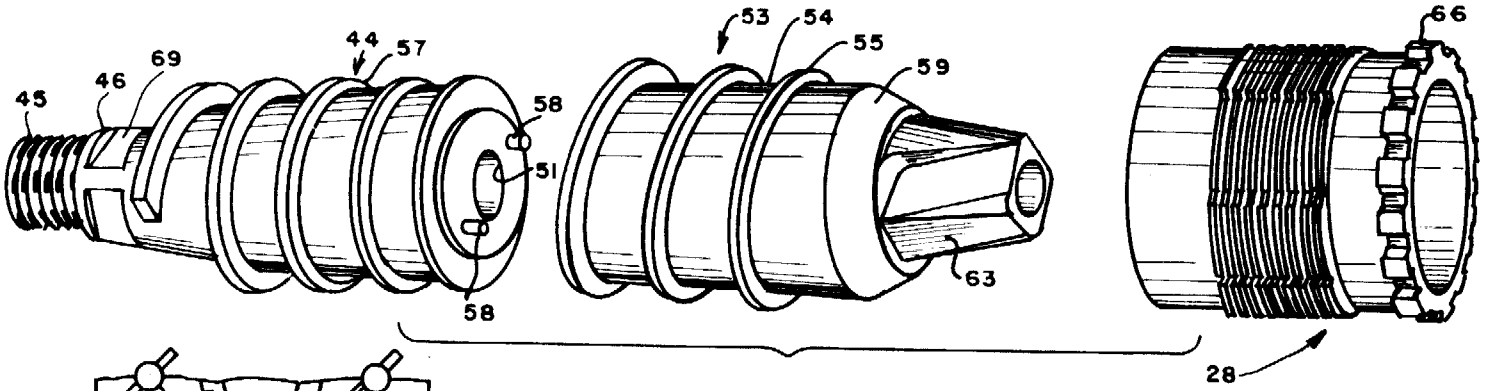
FIG. 3 provides an exploded view of a part of the auger means and valve section of the deboning apparatus; and, FIG. 4 provides a partial transverse sectional view taken along the line 4—4 of FIG. 2.

A more detailed analysis of the operating components of the deboning apparatus D of this invention can be made up reviewing FIGS. 2 and 3. As can be seen, the base member 1 includes the motor 7 thereon, with the shaft 34 from the motor being connected by the coupling 11 to the motor coupling section 35 of the auger means 10. This motor coupling section 35 is supported by the two pillow blocks 12 and 13, as previously described, and each of these pillow blocks contain a bearing means 36 and 37 that provides for unemcumbered rotation of the section 35 therethrough. These bearings may be of the general radial type and may be acquired from Rexnord Corporation, of Downers Grove, Illinois, and having model No. ZMC9-2215. The upper half of the blocks 12 and 13 might be separable, and removed, so as to provide a means for insertion or replacing of the section 35, or the bearings 36 and 37. The threaded apertures 38 may accommodate fasteners for holding the upper halves of these pillow blocks in place. Also disclosed between these blocks 12 and 13, and as previously briefly analyzed, is the thrust bearing 14. This bearing 14 may seat within a counterbore, as at 39, provided within one face of the pillow block 12, so as to provide for its proper centering and fixation with respect to the block, and the motor coupling section 35 that rotates there within, and this bearing is of the type having the usual radial bearing face plates, as at 40, with a series of bearings intermediate thereof. Just adjacent to the thrust bearing 14 are a pair of thrust collars, as at 41 and 42, and each of these collars are provided with a set screw therein for rigidly securing the said collars to the auger section 35, and to achieve their revolving therewith. Hence, the collar 41 is biased tightly against the thrust bearing 14, with the collar 42 being also fixed in place upon the section 35 and tightly against its adjacent collar 41. Preferably these collars will be preloaded in their relationship with respect to the thrust bearing 14 so as to insure a fixed longitudinal positioning of the auger means 10 within the apparatus.

Counterbored into the opposite end of the motor coupling section 35 of the auger means 10 is a bore hole 43, which may have internal threads provided therein, and threadedly engaged therein is the pressure auger section 44 of the auger means 10. This proximate end of the auger section 44 is likewise threaded, as at 45, and is provided with a shoulder 46 for biasing tightly against the approximate end of the section 35 to insure a rigid fastening of these two auger sections together. This pressure auger section 44 extends further into the pressure housing 17 of the apparatus, which housing, as previously defined, is rigidly held in place by means of the supports 15 and 16. The auger section 44, arranged with the pressure housing 17, disposes a series of helical vanes that are integrally formed having a significantly increasing diametrical dimension, along the length of this auger section, as at the base of each vane, so as to provide a means for building up excessive pressure upon the bone laden material as it enters into the pressure housing through the infeed sleeve 18. The continuous vane is shown at 47, and is continuous in its deposition around the auger but has the decreasing depth the further it is disposed within the pressure housing of this apparatus.

As previously briefly explained, the pressure housing 17 contains a slot, as at 48, generally around its upper half circumference, and through this slot is disposed the infeed sleeve 18 of the intake region of the apparatus. This slot 48 is arranged around the upper circumference of the pressure housing 17 so that the infeed sleeve 18, and its connecting integral sleeve 49, may be pivotally revolved to various angular locations radially around the upper portion of this housing 17, so as to dispose the infeed sleeve 18 at that location found to be most convenient for facilitating the intake of the bone laden material into the apparatus. Obviously, any such adjustment will be made while the apparatus is in idle, since to attempt any such adjustment during operation of the apparatus will only encounter the enormous compressive pressures built up upon the bone laden material between the auger 44 and the interior of the sleeve 49, and which would prevent any such pivotal movement to the sleeve 18. It should also be noted that the infeed sleeve 18 may additionally have connected thereto a grinder 50, of the conventional type, and which may grind the carcass of either poultry, fish, or the red meat animal down to that size particle that may be fed under the pressure of the grinder through the infeed sleeve 18 and into the auger section of the pressure housing 17. Such a grinder as may be acquired from the Weiler Grinder Co., of Whitewater, Wisconsin, has been found satisfactory for this purpose, and capable of reducing the bone particle size and the residue meat down to the vicinity of one-thirtysecond to one-half inch components that can be easily accommodated by the pressure auger section of this deboning apparatus. Once the grinder 50 pressure feeds the reduced particle bone laden material into the pressure housing 17, such material will be further pressurized within this housing to the high pressures as previously explained as it rises along the five degree inclining pitch of the pressure auger section 44 through the urging movement of the helical vane 47. Obviously, othe degrees of pitch to this section of the auger can be used.

The opposite end of the pressure auger section 44 is also counterbored, as at 51, with said counterbore being threaded to provide for a mating engagement with the threads provided at this end 52 of the auger means shaft extension 9. Coupled with the pressure auger section 44 at this location is the conveying auger section 53 of the auger means 10. This section of the auger means is in the form of a shaft 54 that is axially aligned with the other sections of the auger means 10, so as to enter into uniform rotation therewith, and includes a contiguous helical rib 55 secured to its surface to thereby provide a means for conveying the bone laden material, as compressed within the pressure housing 17, along the interior of the perforated housing 20. The shaft 54 may be of either uniform diameter from one end to the other end, or it may have a slight rise at a fraction of a degree along its length so as to maintain some of the pressure developed by the pressure auger section 44 as the bone laden material is conveyed along the interior of the housing 20, thereby forcing the meat material through the perforations or apertures provided through the housing 20 while continuing to agitate and convey the boney components therealong by operation of the helically arranged rib 55. As previously analyzed, the brunt of the pressure upon the bone laden material is developed within the pressure housing 17, whereas the conveyor auger section 53 of the apparatus is designed to provide conveyance of this prepressurized material along the interior of the perforated housing 20 so as to attain the bone separation from this material. As further previously analyzed, the meat material being expressed from the perforated housing 20 will fall through the opening 29 provided at the flared portion 30 of the base member 1. Where the shaft 54 has a slightly increasing diameter, an increase in diameter of one-eighth inch from the intake end of the perforated housing 20 to the outlet end has been found satisfactory for maintaining some of the pressure developed within the pressure housing 17. Hence, it is not desired to continuously and forcefully press the bone laden material passing through the perforated housing 20, but rather, it is desired to have some release of pressure by means of the passage of the meat material through the perforated housing, and while this pressure release is occurring its boney components may be agitated or ground together so as to effect a further release of residue meat from the same for its eventual passage through the perforations of the housing 20.

The perforated housing 20, itself, contains a series of predrilled apertures therethrough, and these apertures will vary in size depending upon the type and consistency of the meat product being separated. Generally a hardened stainless steel cylinder having conically drilled holes has been found satisfactory for this purpose. For example, in the poultry field, the apertures may be anywhere in the vicinity of 0.8 millimeters, with an overall range of 0.3 to 2.5 millimeters being found operative, with the commulative aperture area comprising 20 to 50 percent of the surface area of the housing. As a point of illustration, where the calcium content of ground meat can be of a higher percentage, as in Europe, then aperture sizes at the upper end of the range can be accommodated. Also, the aperture size will depend upon whether the meat will be cooled, or in the raw state. In the rod meat field,, these apertures may be in the range of 0.2 to 2.5 millimeters in diameter, and comprise a similar type percentage of the perforated housing surface area. In the fish field, the size of perforations may be more dictated by the bone size, with fine bone fish meat having aperture sizes ranging from 0.3 to 1.5 millimeters, and course bone meat having apertures ranging from 0.3 to 3.0 millimeters. In any event, the main object of this invention is to provide sufficient surface area along the perforated housing 20, and with the properly designed and sized apertures disposed therethrough, so that as the prepressurized boney material is being conveyed at high speeds through the perforated housing, it is forced out of the said housing while the boney content is precluded from doing such, and is agitated and promptly conveyed into its valved discharged end. In addition, it has been found useful not to place the conveying auger too contiguous the interior of the perforated housing, and a five to fifteen thousandths clearance allows for sufficient agitation of the bones to achieve the desired results of this invention.

It should also be noted that where the contiguous ends of the pressure auger section 44 and the conveying auger section 53 connect, each is provided with one or more holes therein, as at 56 and 57, and into which a pin 58 is disposed for holding these two sections together for achieving their simultaneous rotation during functioning of this apparatus.

The downstream end of the conveying auger section 53 has integrally formed a valved section 59, which comprises a decreasing pitch tapered annulus that cooperates with a similar type surface, as at 60, formed upon the interior 61 of the valve sleeve 28. These cooperating surfaces of the valved section 59, and the sleeve 28, are designed to furnish some amount of back pressure upon the boney material being conveyed thereto by means of the conveying auger section 53, in a manner that is generally known in the prior art. In any event, the valve sleeve 28 is threadedly engaged within another sleeve 62 that is secured within the slidable support 19, and through a turning of the sleeve 28, the gap between these tapered surfaces of the cooperating valved members may be adjusted so as to provide the proper amount of clearance for passage of the now substantially ground boney material therethrough to achieve its discharge from the apparatus. Further provided integrally beyond the location of the cooperating tapered surfaces 59 and 60 are integrally formed discharge blades 63 that are designed having the proper slant so as to furnish an immediate disposal and discharge of the boney material exiting from this valve gap so as to totally eliminate any clogging at this location. Since the valve sleeve 28 is hollow through its interior, as can be seen, the boney material just falls from its end and downwardly into any conveniently arranged hopper provided at this location.

As can also be seen cooperating with this end of the auger means 10, the shaft extension 9 has a shoulder 64 that is arranged for abutting against the end of the discharge blades 63, so as to provide a means for tightly securing the pressure auger section 44 and the conveying auger section 53 together, as they are threadedly engaged as at 52. The other proximate end of the shaft extension 9 is bearing mounted within the upwardly inturned end 31 of the base member 1, and, as previously described, the bearing 33 is arranged within the formed aperture 32 to provide the means for providing full bearing support at this end of the auger means of the apparatus. The bearing provided thereat may be any form of shaft bearing as available in the art, but preferably is of the type previously identified.

Another unique feature of this invention is its complemental assembly and securing of its various components together, which allows for both their ease of installing into an operative apparatus, and likewise, for quick disassembly, as when it is desired to cleanse the same. For example, it can be seen that the shaft extension 9, as previously explained, is threadedly engaged at 52 with the pressure auger section 44. When this threaded engagement is removed, as by the turning of a wrench upon the hexagonal end 65, it may be withdrawn from its positioning through the center of the conveying auger section 53, and further removed from its bearing mount 33. Then, the valved sleeve 61 may be turned for its withdrawal from its threaded connection with the sleeve 62. To facilitate the turning of this member 61, it can be seen, from FIG 3, that its exposed end 66 is knurled so as to facilitate its grasping at this location. When this sleeve 61 is removed, the conveying auger section 53 can be slid longitudinally forwardly of the machine to also achieve its removal. This is attained by a simple withdrawal of the section 53 from its pinned connection to the pressure auger section 44. At the same time, the wing nuts 27a may be withdrawn from their mounting upon the rods 21, and once removed, the slide mounted support 19 can be withdrawn from the ways 23 of the base member 1 thereby withdrawing with it the threaded sleeve 62. It can be seen that this threaded sleeve 62 has a shoulder 67 that seats the proximate end of the perforated housing 20, and when this sleeve is removed, this also allows for a withdrawal of the perforated housing 20 from the apparatus. The opposite end of the perforated housing 20 is embraced by the proximate shoulder 68 of the pressure housing 17. Thus, when the perforated housing 20 is removed, the pressure housing 17 may then likewise be slid axially of the apparatus to acquire its removal. Furthermore, by inserting a wrench upon the hexagonal surface 69 of the pressure auger section 44, its threaded engagement by means of the threads 45 within the bored end 43 of the motor coupling section 35 may also be disengaged, allowing this pressure auger section 44 to also be withdrawn from the apparatus. Hence, all of the elements and components of this invention that are exposed to the bone laden material during functioning of the deboning apparatus can be quickly removed through disassembly, thereby facilitating their cleaning, as usually required daily, by various government regulations. As easy as the machine has been disassembled, it may be facily reassembled for immediate functioning of the deboning apparatus as required.

Various modifications to the various structured components of this deboning apparatus may occur to those skilled in the art upon reviewing this detailed disclosure. The preferred embodiment is set forth for illustrative purposes only, and any variations or modifications to the invention, but yet within the scope of the appended claims, are intended to be fully protected by any patent issuing hereon.

Having thus described the invention what is claimed and desired to be secured by Letters Patent is:

1. In the method of separating meat from bone in a deboning apparatus comprising infeeding bone laden material into the apparatus under the force and pressure of a grinder that reduces the same material to a particle size capable of being accommodated by the said apparatus, exposing the infeed material to the cooperative action of a pressure housing and a directly motor driven pressure auger to substantially increase the compressive forces exerted upon the said material therein to above 10,000 psi, revolving said pressure auger in excess of 500 revolutions per minute during functioning of the said apparatus, transferring the said pressurized material to the vicinity of the cooperative action between a perforated housing and a conveying auger to attain an expressing of meat through the said perforated housing and a transfer of its boney component to and through a valved section of the apparatus while gradually attaining a pressure release from the said material from its prepressurized levels, transferring the said bone laden material along the said auger means without effecting its temperature increase in excess of 3° Fahrenheit, and thereafter passing the said boney component through the valved section of the apparatus for its immediate exposure to blades that achieve its prompt disposal from the said deboning apparatus during its functioning.

2. The method of claim 1 and including agitating the said bone laden material through the cooperative action of the conveying auger section and the perforated housing to effect further separation of meat from bone during functioning of the deboning apparatus.

3. In a deboning apparatus of the type disposing an auger means through pressure and perforated housings, with said pressure housing being of the type having an infeed region for depositing bone laden material therein, conveying the said boney material by means of rotation of said auger means within the pressure housing to achieve its pre-pressurization before its transfer into the perforated housing for therein effecting substantial separation of the bone from the material as said material passes through the perforations of the said housing, and conveying the residue bone from the valved discharge end of the housing, the improvement which comprises a base member fully supporting the said auger means, pressure housing, perforated housing, and valved discharge end, said base member having at least a pair of integral pillow blocks extending therefrom, one of each pillow block arranged for supporting an approximate end of the said auger means, bearing means cooperating with each pillow block for stably supporting the auger means for rotation therein, motor means connecting to said auger means for inducing its direct drive in rotation during functioning of the apparatus, said motor means being capable of inducing auger means rotation of between about 500 rpm to 1800 rpm during functioning of the deboning apparatus, said auger means including an axially aligned motor coupling section, said motor means directly connected to the said motor coupling section, a pressure auger section, a conveying auger section, and a valved section, and said sections being normally secured together for simultaneous rotation to affect the pressurizing, conveying, the back pressuring respectively of the bone laden material during functioning of the said apparatus, and pressure and conveying auger sections of the auger means being separable, with an end of the pressure auger section and an end of the conveyor auger section of the auger means being axially aligned and contiguous when the auger means is installed for functioning within the deboning apparatus, a thrust bearing surrounding said motor coupling section and cooperating with one of the pillow blocks of the base member for cushioning the axial thrust generated in the auger means during functioning of the said apparatus, said pressure housing surrounding the pressure auger section of the auger means, a pair of integral supports extending from the base member and providing for securement of the said pressure housing upon the base member, the infeed region for the deboning apparatus being provided at the location of said pressure housing, and said pressure auger section, conveying auger section, and valved section of the auger means and the perforated housing and valved discharge end of the deboning apparatus being removable to facilitate a cleaning of the deboning apparatus when not in use.

4. The invention of claim 3 wherein said conveying auger and valved sections of the auger means are integral.

5. The invention of claim 3 wherein the contiguous ends of said sections are pinned together.

6. The invention of claim 5 wherein each contiguous end of said sections are provided with at least a bore therein, and pin means inserted into each bore across the contiguous ends of said sections for pinning the same together.

7. The invention of claim 3 wherein said pressure auger section and motor coupling section of the auger means are separable.

8. The invention of claim 7 wherein an end of the pressure auger section and an end of the motor coupling section of the auger means are axially aligned and contiguous when the auger means is installed for functioning within the deboning apparatus.

9. The invention of claim 8 wherein the contiguous end of the pressure auger section is threadedly connected to the contiguous end of the motor coupling section.

10. The invention of claim 3 and including a flexible coupling connecting the said motor coupling section directly to the motor means.

11. The invention of claim 3 wherein said thrust bearing includes a bearing portion stationarily mounted against the said pillow block, a thrust collar securing to the said motor coupling section, said collar disposed for riding against the bearing portion of the thrust bearing during functioning of the deboning apparatus.

12. The invention of claim 11 wherein said thrust collar is preloaded in its disposition against the bearing portion of the thrust bearing.

13. The invention of claim 3 and including a grinder communicating with the infeed of the pressure housing and providing for the pressure injection of boney material into the pressure housing during functioning of the deboning apparatus.

14. The invention of claim 3 wherein said infeed region includes a sleeve disposed through the said pressure housing and allowing for the injection of the boney material into the said housing during functioning of the deboning apparatus.

15. The invention of claim 14 wherein said infeed sleeve is pivotal with respect to the pressure housing and can be pivoted into different radial dispositions with respect to said housing for providing injection of the boney material from different angular positions into the pressure housing.

16. The invention of claim 15 wherein said pressure housing includes a slot arranged partially around its circumference and providing the clearance for the pivotal shifting of the infeed sleeve during adjustment of the said infeed region of the deboning apparatus.

17. The invention of claim 16 and including a second sleeve disposed concentrically within the pressure housing proximate the inner surface of the said housing, said infeed sleeve being integrally secured approximately perpendicularly to the said second sleeve and communicating interiorly therewith, said infeed sleeve and the integral second sleeve being pivotal with respect to the said pressure housing to provide adjustment in the disposition of the infeed region with respect to the deboning apparatus.

18. The invention of claim 3 wherein said conveying auger section comprises a shaft extending from the pressure auger section to the valved section of the auger means, a continuous rib secured to the surface of the said shaft and extending helically approximately from the said pressure auger section to the valved section of the auger means, wherein the pressurized bone laden material is carried by the conveying auger section against the interior of the perforated housing for effecting separation of the bone from the material.

19. The invention of claim 18 wherein said shaft has an increasing diameter from its pressure auger section connecting end to the valved section end of the conveying auger section.

20. The invention of claim 18 wherein said base member includes an opening beneath the perforated housing to thereby allow for the free fall of the material exuding through the housing after its separation of the boney material being conveyed therethrough.

21. The invention of claim 20 and including a pair of integral supports extending from the base member approximately at either end of its opening, and said perforated housing being supported by the said integral supports.

22. The invention of claim 21 wherein one of said supports is disposed proximate the securement of the pressure auger section with the conveying auger section, and the other of said supports is disposed proximate the juncture of the conveying auger section with the valved section of the auger means.

23. The invention of claim 22 wherein the support proximate the juncture of the conveying auger section and the valved section of the auger means is adjustably mounted upon the base member.

24. The invention of claim 23 and including at least one rod means securing between said supports and useful for holding the perforated housing stationarily in place upon the base member.

25. The invention of claim 24 wherein the removal of the rod means and axial shift in one direction of the adjustable support frees the perforated housing for its removal from the base member.

26. The invention of claim 25 and including a sleeve being held by the said adjustable support, said sleeve having internal threads, a valve sleeve engaging with the threads of the said sleeve, said valve sleeve arranged for adjustment into contiguity with the valved section of the auger means for maintaining a back pressure against the bone laden material being conveyed intermediate the perforated housing and the conveying auger section of the auger means during functioning of the deboning apparatus.

27. The invention of claim 26 wherein the valve sleeve is adjustable with respect to the valved section of the auger means to thereby allow discharge of the bones separated from the material through the cooperation of the conveying auger section and the perforated housing during functioning of the deboning apparatus.

28. The invention of claim 26 wherein the valved section projects into without extending through the said valve sleeve.

29. The invention of claim 27 and including blades integrally connecting with the valved section of the auger means and providing for discharging of the bones passing by the said valved section of the auger means.

30. The invention of claim 3 wherein said auger means further includes an axial shaft, said shaft extending into the auger means for securing the pressure auger section, conveying auger section, and valved section axially together, and said shaft being supported by the bearinged pillow block arranged at this proximate end of the auger means.

31. The invention of claim 30 wherein the removal of said shaft from the auger means allows for the separation and removal of the conveying auger section with respect to the pressure auger section.

32. The invention of claim 30 wherein said shaft includes an integral shoulder and wherein said shoulder biases against the end of the valved section of the auger means to secure the said sections together in assembly of the auger means during operation of the deboning apparatus.

*33. In a de-boning machine having an auger, a barrel in which said auger is rotatable and having a rear feed inlet end and a front discharge end, rigid support means for mounting said barrel and supporting said barrel at least adjacent both said rear feed inlet and said front discharge end, bearings, supporting said auger for substantially vibration-free co-axial high speed rotation within said barrel when driven at speeds of at least about 550 rpm, power means connected in driving relationship with said auger for rotating the same at speeds of at least about 500 rpm, means for feeding material to be de-boned into said rear feed inlet end of said barrel, and valve means providing a restricted annular discharge orifice for de-meated bone material adjacent said front discharge end,*

*said barrel comprising an imperforate cylindrical section extending forwardly from said inlet end thereof and a perforated cylindrical section extending forwardly from said imperforate cylindrical section to said discharge end, the perforations in said perforated cylindrical section being small enough to prevent passage therethrough of bone particles of appreciable size,*

*said auger having a pressurizing section housed within said imperforate cylindrical section and a conveying section housed within said perforated cylindrical section, said pressurizing section having a helical vane or flight the radial depth of which decreases substantially from adjacent said rear feed inlet end of said imperforate cylindrical section to the front end thereof, and said conveying section having a helical vane or flight the radial depth of which ranges from substantial uniformity to a slight decrease toward said front discharge end of said perforated cylindrical section, and*

*said valve means comprising a valve sleeve and means for supporting said sleeve co-axially juxtaposed in front of said perforated cylindrical section with a space between the front end of said auger conveying section and the rear inlet end of said valve sleeve providing said restricted annular discharge orifice,*

*there being a radial clearance of at least about 0.005 inch between the outside diameter of the vane or flight on said conveying section of said auger and the interior of said perforated cylindrical section of said barrel, and in operation*

*the boney content of the material being agitated and ground together as it is conveyed through said perforated cylindrical section of said barrel thereby releasing meat therefrom and said restricted annular orifice furnishing back pressure upon the boney material conveyed thereto.*

*34. The method of separating meat from bone in a deboning apparatus comprising feeding bone laden material into the rear inlet end of an imperforate cylindrical section of a rigidly mounted barrel rigidly supported at least adjacent opposite ends in which a co-axial auger is rotating without appreciable vibration at a speed of at least about 550 rpm, pressurizing said material within said imperfor-*

*ate cylindrical section sufficiently as the result of the decreasing radial depth of the vane or flight on the portion of the auger therein to deliver said pressurized material from the front end of said imperforate cylindrical section into the rear inlet end of a perforated cylindrical section of said barrel in which a conveying section of said auger rotates the outer diameter of the vane or flight on which has a clearance of at least about 0.005 inch with respect to the interior of said perforated section, separating the meat component from the bone component of said bone laden material as it is conveyed from the rear inlet end to the front discharge end of said perforated cylindrical section such separation in part resulting from agitation of the bone component, allowing the separated meat component to escape through the perforations in said perforated cylindrical section, and restricting the discharge of the de-meated bone component through an annular discharge orifice adjacent the discharge end of said perforated cylindrical section sufficiently to create a back pressure on the bone laden material.*

* * * * *